(12) United States Patent
Käske

(10) Patent No.: US 7,854,328 B2
(45) Date of Patent: Dec. 21, 2010

(54) FILTER CARTRIDGE FOR A REVERSIBLE FLOW FILTER

(75) Inventor: Egon Käske, Aachen (DE)

(73) Assignee: Dürr Ecoclean, GmbH (DE)

( * ) Notice: Subject to any disclaimer, the term of this patent is extended or adjusted under 35 U.S.C. 154(b) by 4 days.

(21) Appl. No.: 12/357,832

(22) Filed: Jan. 22, 2009

(65) Prior Publication Data

US 2009/0159524 A1   Jun. 25, 2009

Related U.S. Application Data

(63) Continuation of application No. PCT/EP2007/006850, filed on Aug. 2, 2007.

(30) Foreign Application Priority Data

Aug. 23, 2006   (DE) ................. 10 2006 039 508

(51) Int. Cl.
  *B01D 29/17*   (2006.01)
  *B01D 29/62*   (2006.01)
  *B01D 29/66*   (2006.01)
(52) U.S. Cl. ..................... 210/411; 210/121
(58) Field of Classification Search ................ 210/41, 210/121, 411
  See application file for complete search history.

(56) References Cited

U.S. PATENT DOCUMENTS 598,190 A    2/1898  Wilcox
3,542,195 A   11/1970 Soriente
3,703,465 A   11/1972 Reece et al.
3,754,651 A *  8/1973 Lannoch ............... 210/106

FOREIGN PATENT DOCUMENTS

| DE | 1943999 | 8/1969 |
| DE | 10244660 | 4/2004 |
| EP | 1685888 | 8/2006 |
| WO | 2007062763 | 6/2007 |

OTHER PUBLICATIONS

International Searching Authority, International Search Report for PCT/EP2007/006850, Nov. 7, 2007, 6 pages.
German Office Action for Application DE 10 2006 039 508.5, Mar. 22, 2007, 4 pages.

* cited by examiner

*Primary Examiner*—Thomas M Lithgow
(74) *Attorney, Agent, or Firm*—Hanley, Flight & Zimmerman, LLC

(57) ABSTRACT

In order to produce a filter cartridge for a reversible flow filter for filtering a fluid which comprises a filter cartridge interior surrounded by a filtering medium, whereby the filtering medium is adapted to be cleaned in a particularly effective and uniform manner during the back flushing phase, it is proposed that the filter cartridge should comprise a reverse flow damming body which is arranged in the interior of the filter cartridge and is movable in a longitudinal direction of the filter cartridge by the reverse flow when back flushing the filter cartridge and produces a local increase in the dynamic pressure of the reverse flow, whereby the reverse flow damming body does not abut against the filtering medium when back flushing the filter cartridge.

16 Claims, 2 Drawing Sheets

FILTER CARTRIDGE FOR A REVERSIBLE FLOW FILTER

RELATED APPLICATION

This application is a continuation application of PCT/EP2007/006850 filed Aug. 2, 2007, the entire specification of which is incorporated herein by reference.

FIELD OF DISCLOSURE

The present invention relates to a filter cartridge for a reversible flow filter for filtering a fluid which comprises a filter cartridge interior surrounded by a filtering medium.

BACKGROUND

Such a filter cartridge is known from DE 102 44 660 A1.

In this known filter cartridge, a cleaning body, which is provided with fine bristles, brushes, flexible lips or flexible scrapers on the surface thereof, is arranged in the interior of the filter cartridge, the length of said bristles etc. being selected in such a manner that the overall diameter of the cleaning body turns out to be greater than the clearance in the interior of the filter cartridge. The filtering medium is arranged on the inside of the filter cartridge and is mechanically cleaned during a back flushing phase of the filter cartridge by the bristles, brushes, flexible lips or flexible scrapers that are disposed on the cleaning body.

Hereby, it is disadvantageous that the mechanical cleaning effect produced by the cleaning body is not applied evenly over the surface of the filter and that the filtering medium is subjected to wear and tear due to the mechanical contact with the cleaning body.

SUMMARY OF THE INVENTION

The object of the present invention is to produce a filter cartridge of the type specified hereinabove the filtering medium of which is adapted to be cleaned in a particularly effective and uniform manner during the back flushing phase.

In accordance with the invention, this object is achieved by a filter cartridge in accordance with claim 1.

The filter cartridge in accordance with the invention comprises a reverse flow damming body which is arranged in the interior of the filter cartridge and is movable in a longitudinal direction of the filter cartridge by the reverse flow when back flushing the filter cartridge and produces a local increase in the dynamic pressure of the reverse flow. Due to the increase of the dynamic pressure in the direct neighborhood of the reverse flow damming body, the reverse flow is caused to flow in a particularly intensive manner through that part of the filtering medium which is directly adjacent the momentary position of the reverse flow damming body so that impurities in the vicinity of the position at which the reverse flow damming body is located are cleaned out of the filtering medium in a particularly effective manner.

The reverse flow damming body does not abut against the filtering medium requiring cleaning when back flushing the filter cartridge so that there is no mechanical contact between the reverse flow damming body and the filtering medium, this thereby ensuring that the filtering medium does not become worn down by contact with the reverse flow damming body. Furthermore, the effect is achieved that the movement of the reverse flow damming body in the longitudinal direction of the filter cartridge is not braked during the back flushing process by mechanical friction or by virtue of it adhering to the filtering medium. Moreover, the reverse flow damming body is not dirtied by the particles that have been dislodged from the filter medium.

Preferably, the reverse flow damming body moves over the entire longitudinal extent of the filter cartridge during the back flushing phase of the filter cartridge so that there is an increase in the reverse flow pressure at each point of the filtering medium when the reverse flow damming body is passing by that particular point.

This thereby prevents the back-flushing stream from flowing intensively through the filtering medium at only those positions where the resistance to the flow is low. Consequently, in the case of the filter cartridge in accordance with the invention, the cleaning effect during the back flushing phase is significantly increased especially in the regions of the filtering medium near the discharge outlet.

In the case of the filter cartridge in accordance with the invention, the fluidic back flushing effect is intensified without any need for the filtering medium to be mechanically cleaned by a cleaning body coming into contact with the filtering medium. Consequently, the cleaning of the filtering medium in the filter cartridge in accordance with the invention is performed in a particularly effective, uniform and gentle manner.

Due to the improved back flushing of the filtering medium and the avoidance of any mechanical wear and tear thereto during the back flushing process, the service life of the filter cartridge is extended significantly.

In a preferred embodiment of the invention, provision is made for the extent of the reverse flow damming body transverse to the longitudinal direction of the filter cartridge to be smaller than the inner width of the interior of the filter cartridge transverse to the longitudinal direction of the filter cartridge. The effect is thereby achieved that the reverse flow damming body can move substantially unhindered through the interior of the filter cartridge.

On the other hand, the extent of the reverse flow damming body relative to the inner width of the interior of the filter cartridge must not be too small if a sufficient increase of the reverse flow damming pressure is to be obtained. Advantageously therefore, the extent of the reverse flow damming body transverse to the longitudinal direction of the filter cartridge amounts to at least approximately 80%, and preferably to at least approximately 90% of the inner width of the interior of the filter cartridge.

It has proven to be particularly expedient, if the width of a gap between the reverse flow damming body on the one hand and a bounding wall of the interior of the filter cartridge on the other amounts to at most approximately 3 mm, and preferably to at most approximately 2 mm.

In principle, the reverse flow damming body can have any arbitrary shape. In particular where use is made of a substantially cylindrical filter cartridge, it is expedient if the reverse flow damming body is substantially spherical or substantially cylindrical, because these shapes are particularly well adapted to the cross section of the interior of the filter cartridge.

In order not to obstruct the movement of the reverse flow damming body through the interior of the filter cartridge, it is expedient if the reverse flow damming body has a projection-free surface which, in particular, is free of bristles, brushes, flexible lips, flexible scrapers or other protrusions.

A particularly frictionless movement of the reverse flow damming body through the interior of the filter cartridge is obtained, if the reverse flow damming body does not rest against a bounding wall of the interior of the filter cartridge when back flushing the filter cartridge.

In a preferred embodiment of the invention, provision is made for the reverse flow damming body to be disposed at an upper end of the filter cartridge during the filtration phase of the reversible flow filter and then to be moved downwardly from this upper end in the longitudinal direction of the filter cartridge during the back flushing phase.

In order to achieve the effect that the reverse flow damming body will automatically return to its starting position at the upper end of the filter cartridge after the back flushing phase has ended, provision may be made for the reverse flow damming body to have a lower average density than the filtered fluid. In this way, the lifting force effective on the reverse flow damming body within the filtered fluid is greater than the force effective on the reverse flow damming body due to its weight.

In order to achieve this effect, the reverse flow damming body can be in the form of a hollow body for example.

As an alternative or in addition thereto, provision may also be made for the reverse flow damming body to be comprised of a material which has a lower density than the filtered fluid.

In particular, provision may be made for the reverse flow damming body to consist entirely of a material which has a lower density than the filtered fluid.

In a preferred embodiment of the invention, the filter cartridge is substantially cylindrical.

Furthermore, it is expedient if the filter cartridge comprises a stop means for the reverse flow damming body against which the reverse flow damming body rests during the filtration phase of the filter cartridge. In this way, the position of the reverse flow damming body is well-defined during the filtration phase of the filter cartridge.

In a preferred embodiment of the invention, provision is made for the filter cartridge to comprise a reverse flow damming body seating for the reverse flow damming body, in which said seating the reverse flow damming body is accommodated during the filtration phase of the filter cartridge, wherein the reverse flow damming body seating comprises at least one fluid channel for directing the filtered fluid past the reverse flow damming body. In this way, the filtered fluid can flow past the reverse flow damming body unhindered during the filtration phase so that the flow resistance of the filter cartridge is not increased by the presence of the reverse flow damming body.

In order to fix the position of the reverse flow damming body within the reverse flow damming body seating in the radial direction, provision may be made for the reverse flow damming body seating to comprise at least one projection pointing into the interior of the reverse flow damming body seating.

For the purposes of increasing the mechanical stability of the arrangement, the filter cartridge preferably comprises a supporting body which supports the filtering medium.

In a preferred embodiment of the invention, provision is made for the filtering medium to be arranged on the outer surface of the supporting body remote from the interior of the filter cartridge. Thus, in a simple manner, the reverse flow damming body is prevented from resting against the filtering medium when back flushing the filter cartridge.

Furthermore, provision is preferably made for the filter cartridge to be flowed through from the exterior to the interior in the filtration phase.

Further features and advantages of the invention form the subject matter of the following description and the graphic illustration of an exemplary embodiment.

BRIEF DESCRIPTION OF THE DRAWINGS

Similar or functionally equivalent elements are designated by the same reference symbols in each of the Figures.

DETAILED DESCRIPTION OF THE INVENTION

Figure 1:
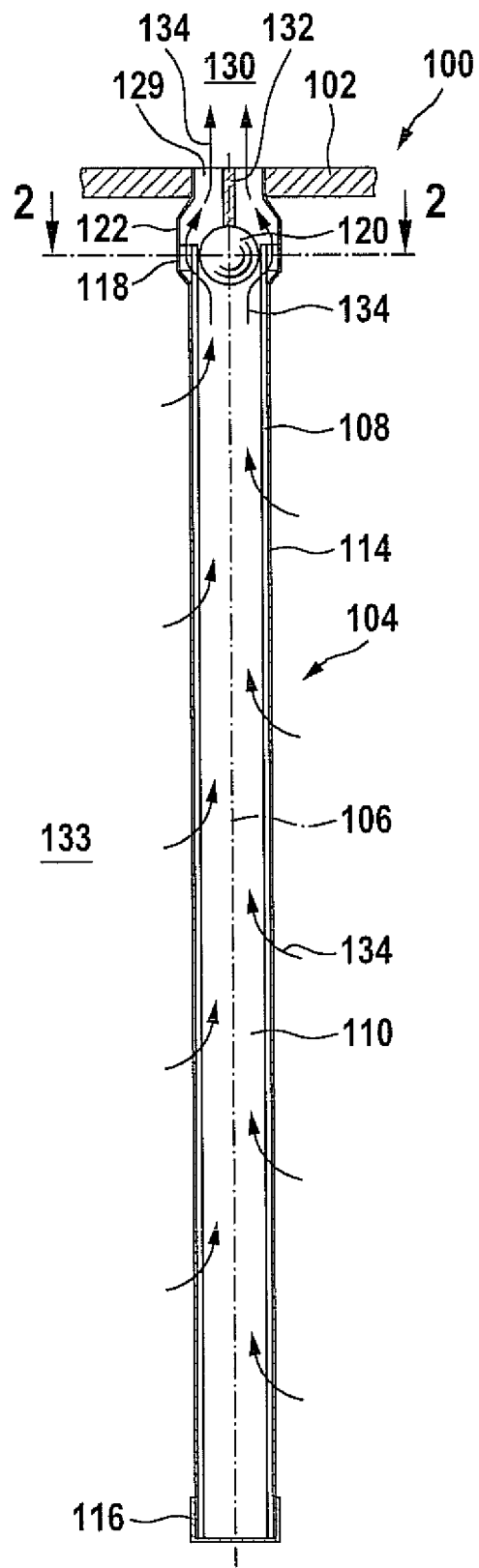
FIG. 1 shows a schematic vertical longitudinal section through a filter cartridge incorporating a reverse flow damming body, wherein the filter cartridge is in the filtration phase.

A reversible flow filter bearing the general reference 100 and illustrated in FIGS. 1 to 4 comprises at least one substantially cylindrical filter cartridge 104 having a substantially vertically aligned longitudinal central axis 106 which is held on a mounting plate 102.

The filter cartridge 104 comprises a cylindrical supporting body 108 which encloses a substantially cylindrical interior 110 of the filter cartridge and has reinforcement ribs 112 which protrude into the interior 110 of the filter cartridge and extend in parallel with the longitudinal central axis 106 of the filter cartridge 104 and which are substantially mutually equidistantly spaced in the circumferential direction of the filter cartridge 104.

The mutual spacing D of the radially inward ends of two diametrically opposite reinforcement ribs 112 defines the inner width of the interior 110 of the filter cartridge.

The supporting body 108 including the reinforcement ribs 112 can be made of high-grade steel for example.

The outer surface of the supporting body 108 is surrounded by a cylindrical filtering medium 114 which may, for example, be in the form of a filter fabric or slotted-sieve and be supported on the outer surface of the supporting body 108.

The filtering medium 114 can, in particular, be made from a high-grade steel fabric or from a fabric of synthetic material.

If the filtering medium 114 is in the form of a filter fabric, then the average mesh size of the filter fabric preferably amounts to from approximately 20 μm to approximately 100 μm.

If the filtering medium 114 is in the form of a slotted-sieve, then the average gap width preferably amounts to from approximately 20 μm to approximately 100 μm.

The lower end of the supporting body 108 and the filtering medium 114 is closed by means of a cover cap 116.

Figure 2:
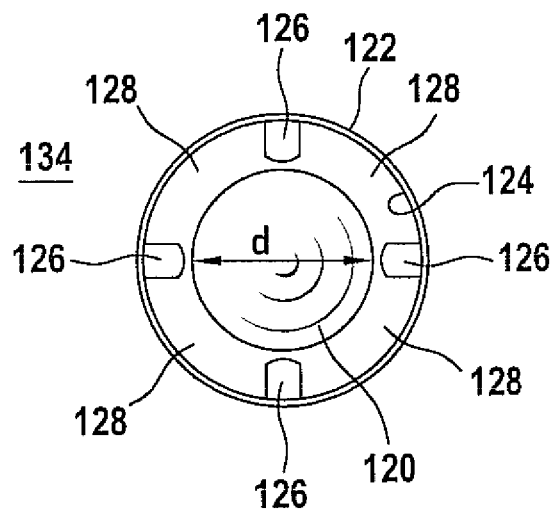
FIG. 2 a schematic horizontal cross section along the line 2-2 in FIG. 1 through a reverse flow damming body seating of the filter cartridge depicted in FIG. 1 in the filtration phase.

At the upper, open end of the filter cartridge 104, there is arranged a reverse flow damming body seating 118 which accommodates an e.g. spherical reverse flow damming body 120 during a filtration phase of the filter cartridge 104, as is illustrated in FIGS. 1 and 2.

The reverse flow damming body seating 118 comprises a housing 122 which is formed and arranged such as to be coaxial with the supporting body 108 and from the inner surface 124 whereof several, four for example, struts 126 which extend in parallel with the longitudinal central axis 106 of the filter cartridge 104 and are spaced substantially mutually equidistantly in the circumferential direction of the filter cartridge 104 project in the radial direction into the interior of the reverse flow damming body seating 118 in order to centralise the reverse flow damming body 120 between their radially inward ends.

A respective fluid channel 128 through which filtered fluid can flow past the reverse flow damming body 120 in the filtration phase is formed between each two successive struts 126 in the circumferential direction of the filter cartridge 104.

The upper end of the housing 122 of the reverse flow damming body seating 118 is fixed to the mounting plate 102 of the filter cartridge 104 and has an outlet opening 129 through which filtered fluid can flow out from the interior 110 of the filter cartridge into a filtrate area 130.

The reverse flow damming body 120 has a lower average density than the filtered fluid so that the lifting force effective on the reverse flow damming body 120 is greater than the force effective on the reverse flow damming body 120 due to its weight, for which reason, the reverse flow damming body 120 is located in the reverse flow damming body seating 118 arranged at the upper end of the filter cartridge 104 in the filtration phase of the filter cartridge 104 illustrated in FIGS. 1 and 2.

Passage of the reverse flow damming body 120 through the outlet opening 129 of the filter cartridge 104 is prevented by a stop means 132 which extends right across the upper part of the reverse flow damming body seating 118 whilst the lower end thereof presses against the reverse flow damming body 120 during the filtration phase.

The reverse flow damming body 120 can, for example, be in the form of a hollow body, in particular, a hollow ball made from a synthetic material or from a metallic material consisting, in particular, of a high-grade steel.

Alternatively thereto, the reverse flow damming body 120 could also be in the form of a solid consisting of a material which has a lower density than the filtered fluid.

The reverse flow damming body 120 has a smooth surface which is not provided with bristles, brushes, flexible lips, flexible scrapers or other protrusions of any sort whatsoever.

The previously described reversible flow filter 100 functions as follows:

During the filtration phase illustrated in FIGS. 1 and 2, the fluid, a liquid which is to be filtered for example and which is carrying solid impurities along therewith, flows out of a dirty space 133 surrounding the filter cartridge 104 through the filtering medium 114 and the passage openings between the reinforcement ribs 112 of the supporting body 108 into the interior 110 of the filter cartridge, whereby the impurities that need to be filtered out are deposited on the outer surface of the filtering medium 114 and/or within the filtering medium 114.

The direction of flow of the fluid during the filtration phase is indicated by the arrows 134 in FIG. 1.

From the interior 110 of the filter cartridge, the filtered fluid passes by the reverse flow damming body 120 through the fluid channels 128 of the reverse flow damming body seating 118 and reaches the filtrate area 130 through the outlet opening 129.

Figure 3:
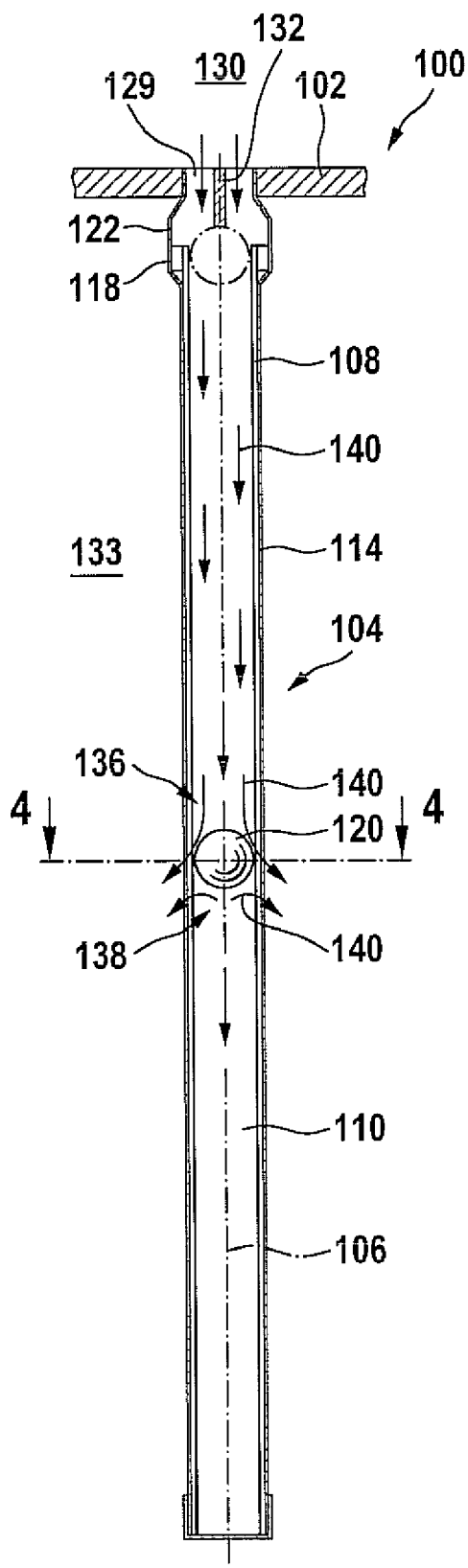
FIG. 3 a schematic vertical longitudinal section through the filter cartridge depicted in FIG. 1 during a back flushing phase.
Figure 4:
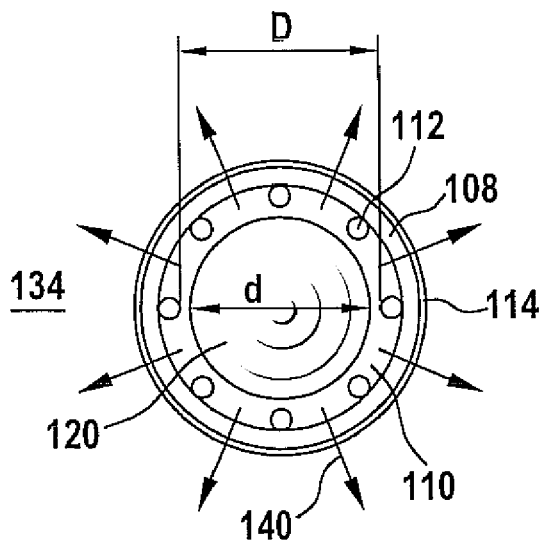
FIG. 4 a schematic horizontal cross section along the line 4-4 in FIG. 3 through the filter cartridge depicted in FIG. 3 during the back flushing phase.

When the filtering medium 114 has attained a certain degree of soiling or else at the expiration of a given filtration time, the reversible flow filter 100 is switched from the filtration phase into the back flushing phase illustrated in FIGS. 3 and 4, in which filtered fluid from the filtrate area 130 is forced back into the interior 110 of the filter cartridge by means of a (not illustrated) reverse flow mechanism at an elevated reverse flow pressure of approximately 3 bar to approximately 5 bar for example, in order, after the back flushing flow has passed through the supporting body 108 and the filtering medium 114, to dislodge the impurities that have been deposited on the filtering medium 114 from the filtering medium 114.

This fluidic back flushing effect is significantly increased by the reverse flow damming body 120 arranged in the interior 110 of the filter cartridge.

The reverse flow damming body 120, the upper surface of which is subjected to the elevated reverse flow pressure of the back flushing flow, is moved downwardly by the reverse flow pressure along the longitudinal central axis 106 of the filter cartridge 104, as illustrated in FIG. 3.

Hereby, the reverse flow damming body 120 does not touch, or only very briefly touches the inner bounding wall of the supporting body 108 and the reinforcement ribs 112 of the supporting body 108 since the diameter d of the reverse flow damming body 120 is smaller than the inner width D of the interior 110 of the filter cartridge, so that a gap of up to approximately 3 mm develops between the surface of the reverse flow damming body 120 and the radially inward ends of the reinforcement ribs 112 when the reverse flow damming body has a diameter d of approximately 20 mm for example.

Due to the gap remaining between the reverse flow damming body 120 and the supporting body 108, the reverse flow damming body 120 is pressed downwardly through the interior 110 of the filter cartridge in substantially frictionless manner.

Since the gap remaining between the reverse flow damming body 120 and the supporting body 108 is comparatively small however, this results in an increased dynamic pressure in the back flushing flow in that part of the interior 110 of the filter cartridge located directly before the reverse flow damming body 120 in the direction of flow of the back flushing stream.

At the same time, there is likewise a resulting increased dynamic pressure in that part 138 of the interior 110 of the filter cartridge located directly behind the reverse flow damming body 120 in the direction of flow of the back flushing stream due to the inertia of the fluid that is to be displaced by the reverse flow damming body 120.

Due to the increase in the dynamic pressure within the regions 136 and 138 in the direct neighbourhood of the reverse flow damming body 120, there is a particularly intensive flow of the back flushing flow through the filtering medium 114 in those areas thereof directly adjacent to the momentary position of the reverse flow damming body 120 so that impurities in that particular region in which the reverse flow damming body 120 is currently located are cleaned off from the filtering medium 114 in a particularly effectively manner.

The direction of flow of the back flushing stream is indicated in FIGS. 3 and 4 by the arrows 140.

Since the back flushing phase is carried out for the amount of time required for the reverse flow damming body 120 to move from the reverse flow damming body seating 118 to the lower end of the filter cartridge 104, the area of intensive flushing produced by the presence of the reverse flow damming body 120 stretches over the entire surface of the filtering medium 114 so that the entire surface of the filtering medium 114 is flushed through and cleansed in a particularly intensive manner.

Due to this intensive flushing of the filtering medium 114 during the back flushing phase, the filter cartridge 104 has a particularly long service life.

Furthermore, due to the fact that the reverse flow damming body 120 moves downwardly at a substantially constant speed through the interior 110 of the filter cartridge, the entire surface of the filtering medium 114 is flushed through and cleansed in a very uniform manner so that there are no parts of the filtering medium 114 that are only inadequately cleaned and would thus shorten the service life of the filter cartridge 104 as a whole.

The reverse flow damming body 120 does not come into contact with the filtering medium 114 during the back flushing process, so that the cleaning of the filtering medium 114 in the back flushing phase is effected merely by the enhanced fluidic back flushing effect alone and not by means of a mechanical cleansing action using the reverse flow damming body.

After the ending of the reverse flow during the back flushing phase, the reverse flow damming body 120 automatically rises upwardly again from the lower end of the interior 110 of the filter cartridge into the reverse flow damming body seating 118, since the lifting force effective on the reverse flow damming body 120 outweighs the force effective on the reverse flow damming body 120 due to its weight.

Thereafter, the operation of the reversible flow filter 100 is continued with a further filtration phase.

The invention claimed is:

1. A filter cartridge for a reversible flow filter for filtering a fluid, comprising a filter cartridge interior which is surrounded by a filtering medium, and a reverse flow damming body which is arranged in the interior of the filter cartridge and is moveable in a longitudinal direction of the filter cartridge by the reverse flow when back flushing the filter cartridge and produces a local increase in the dynamic pressure of the reverse flow, wherein the reverse flow damming body does not abut against the filtering medium when back flushing the filter cartridge, wherein the filter cartridge comprises a reverse flow damming body seating for the reverse flow damming body, in which said seating the reverse flow damming body is accommodated during the filtration phase of the filter cartridge, wherein the reverse flow damming body seating comprises at least one fluid channel for directing the filtered fluid past the reverse flow damming body and at least one projection pointing into the interior of the reverse flow damming body seating.

2. A filter cartridge in accordance with claim 1, wherein the extent of the reverse flow damming body transverse to the longitudinal direction of the filter cartridge is smaller than the inner width of the interior of the filter cartridge transverse to the longitudinal direction of the filter cartridge.

3. A filter cartridge in accordance with claim 1, wherein the extent of the reverse flow damming body transverse to the longitudinal direction of the filter cartridge amounts to at least approximately 80%, and preferably to at least approximately 90% of the inner width of the interior of the filter cartridge.

4. A filter cartridge in accordance with claim 1, wherein the width of a gap between the reverse flow damming body on the one hand and a bounding wall of the interior of the filter cartridge on the other amounts to at most approximately 3 mm, preferably to at most approximately 2 mm.

5. A filter cartridge in accordance with claim 1, wherein the reverse flow damming body is substantially spherical.

6. A filter cartridge in accordance with claim 1, wherein the reverse flow damming body is substantially cylindrical.

7. A filter cartridge in accordance with claim 1, wherein the reverse flow damming body has a projection-free surface.

8. A filter cartridge in accordance with claim 1, wherein the reverse flow damming body does not abut against a bounding wall of the interior of the filter cartridge when back flushing the filter cartridge.

9. A filter cartridge in accordance with claim 1, wherein the reverse flow damming body has a lower average density than the filtered fluid.

10. A filter cartridge in accordance with claim 1, wherein the reverse flow damming body is in the form of a hollow body.

11. A filter cartridge in accordance with claim 1, wherein the reverse flow damming body comprises a material which has a lower density than the filtered fluid.

12. A filter cartridge in accordance with claim 1, wherein the filter cartridge is substantially cylindrical.

13. A filter cartridge in accordance with claim 1, wherein the filter cartridge comprises a stop means for the reverse flow damming body against which the reverse flow damming body abuts during the filtration phase of the filter cartridge.

14. A filter cartridge in accordance with claim 1, wherein the filter cartridge comprises a supporting body which supports the filtering medium.

15. A filter cartridge in accordance with claim 14, wherein the filtering medium is arranged on the outer surface of the supporting body remote from the interior of the filter cartridge.

16. A filter cartridge in accordance with claim 1, wherein the filter cartridge is flowed through from the exterior to the interior in the filtration phase.

* * * * *